(12) United States Patent
Haaks et al.

(10) Patent No.: US 8,242,728 B2
(45) Date of Patent: Aug. 14, 2012

(54) METHOD FOR MODERNIZING A TECHNICAL SYSTEM AND AN APPROPRIATE DRIVE ELEMENT

(75) Inventors: Stefan Haaks, Erlangen (DE); Gerd Michaelis, Möhrendorf (DE); Christian-Marius Wegner, Ansbach (DE)

(73) Assignee: Siemens Aktiengesellschaft, München (DE)

( * ) Notice: Subject to any disclaimer, the term of this patent is extended or adjusted under 35 U.S.C. 154(b) by 1375 days.

(21) Appl. No.: 10/555,970

(22) PCT Filed: May 7, 2004

(86) PCT No.: PCT/EP2004/004911
§ 371 (c)(1),
(2), (4) Date: Jun. 19, 2009

(87) PCT Pub. No.: WO2004/099887
PCT Pub. Date: Nov. 18, 2004

(65) Prior Publication Data
US 2010/0007298 A1    Jan. 14, 2010

(30) Foreign Application Priority Data
May 8, 2003  (DE) .................. 103 20 826

(51) Int. Cl.
*H02P 7/00* (2006.01)
(52) U.S. Cl. .......... 318/432; 318/560; 318/568.11; 318/569; 318/721; 318/799
(58) Field of Classification Search ............ 318/30, 318/560, 568.18, 569, 595, 599, 600, 625, 318/689, 432, 430, 440, 445, 563, 568.11, 318/721, 727, 799, 3, 5, 34, 103, 135, 400.01, 318/400.15, 400.23; 425/145; 60/451; 701/41
See application file for complete search history.

(56) References Cited

U.S. PATENT DOCUMENTS 3,926,513 A * 12/1975 Silver et al. ............ 353/26 R
(Continued)

FOREIGN PATENT DOCUMENTS

DE        197 27 824 C1     11/1998
(Continued)

OTHER PUBLICATIONS

Rockwell Automation, "Rockwell Automation's drives upgrade 'on the run' at an Australian paper mill saves US$2.8 million in installation costs", Industry Value Proposition, [Online], www.rockwellautomation.com, Feb. 28, 2003, pp. 1-3; PULIVP-AP002A-EN-D, Milwaukee, WI.

(Continued)

*Primary Examiner* — Bentsu Ro
*Assistant Examiner* — Antony M Paul

(57) ABSTRACT

One embodiment relates to modernizing a technical system, in particular a producing system with the aim of obtaining economic and technical advantages. The technical system comprises at least one drive mechanism provided with at least one drive motor powered by a power element, a torque controller controlling the power element and a speed controller prescribing the nominal value of the torque (Msoll) for the torque controller. When the determination of the nominal value of the torque (Msoll) for the torque controller by the speed controller is deactivated, a standard drive element is available. The drive element comprises at least one speed controller, a torque controller and a power element. The nominal value of the torque (Msoll) of the torque controller of the drive motor is determined by a speed controller of the standard drive element.

23 Claims, 4 Drawing Sheets

U.S. PATENT DOCUMENTS

| | | | | |
|---|---|---|---|---|
| 5,047,702 A | * | 9/1991 | Hanaki et al. | 318/625 |
| 5,362,222 A | * | 11/1994 | Faig et al. | 425/145 |
| 5,428,285 A | * | 6/1995 | Koyama et al. | 318/799 |
| 5,646,492 A | * | 7/1997 | Nagano et al. | 318/432 |
| 5,947,023 A | * | 9/1999 | Bohrer et al. | 101/181 |
| 6,142,760 A | * | 11/2000 | Niizeki et al. | 425/145 |

FOREIGN PATENT DOCUMENTS

| EP | 0 523 601 A1 | 1/1993 |
|---|---|---|

OTHER PUBLICATIONS

ABB, "Direct Torque Control—the world's most advanced AC drive technology", [Internet], Apr. 26, 2002, pp. 2-31, Technical Guide No. 1, Helsinki, Finland.

Dave Zimmer and Duncan Rhodes, "#3 Paper Machine Drive Upgrade, A Drive Upgrade Done During Machine Washups", Conference Record of the 2001 Annual Pulp and Paper Industry Technical Conference, Jun. 18-22, 2001, IEEE, pp., 75-80, Portland, OR, previously presented at TAPPI/ISA PUPID PCE&I Conference, Mar. 26-30, 2000, Williamsburg, Virginia.

Dag N. Sollander, "Nachrüstung von Stab- und Feinstahlwalzwerken mit modemer Regelungstechnik", ABB Technik Apr. 1999, pp. 27-32, ABB Automation Systems AB, Västerås/Schweden.

Mauri Peltola, Seppo Perala and Uno T. Bryfors, "ACS 600-Antriebe mit direkter Drehmoment-regelung", ABB Technik Jun. 1997, pp. 31-39, ABB Industrial Systems AB, Västerås/Schweden.

\* cited by examiner

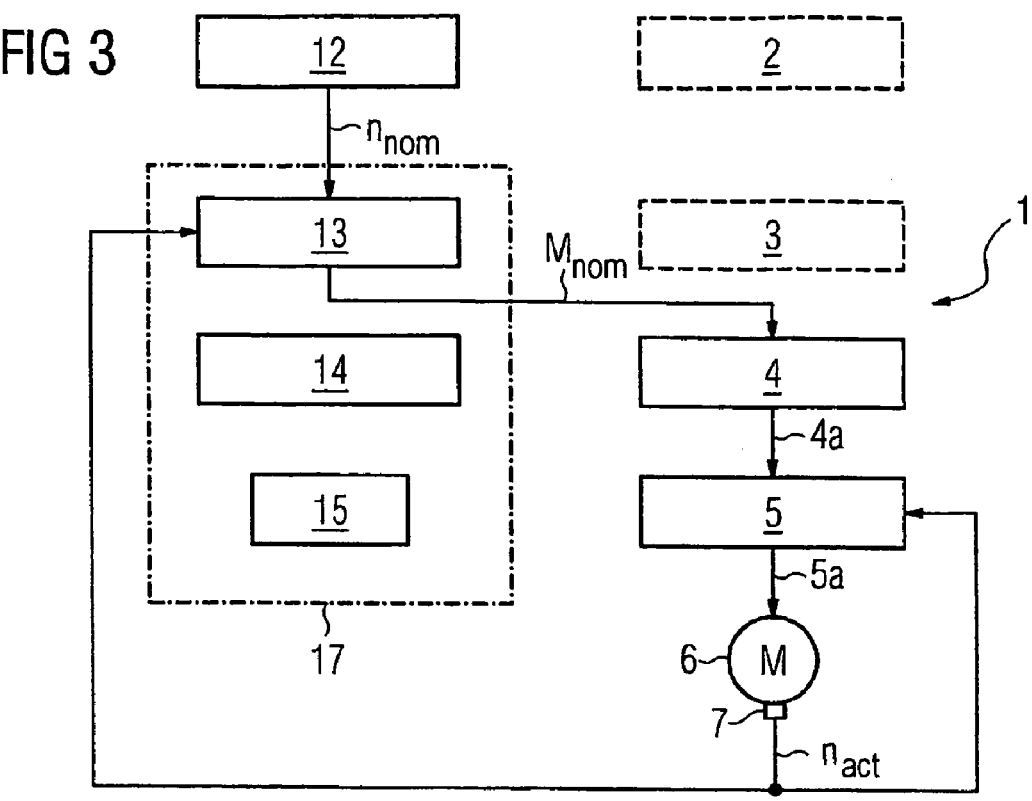
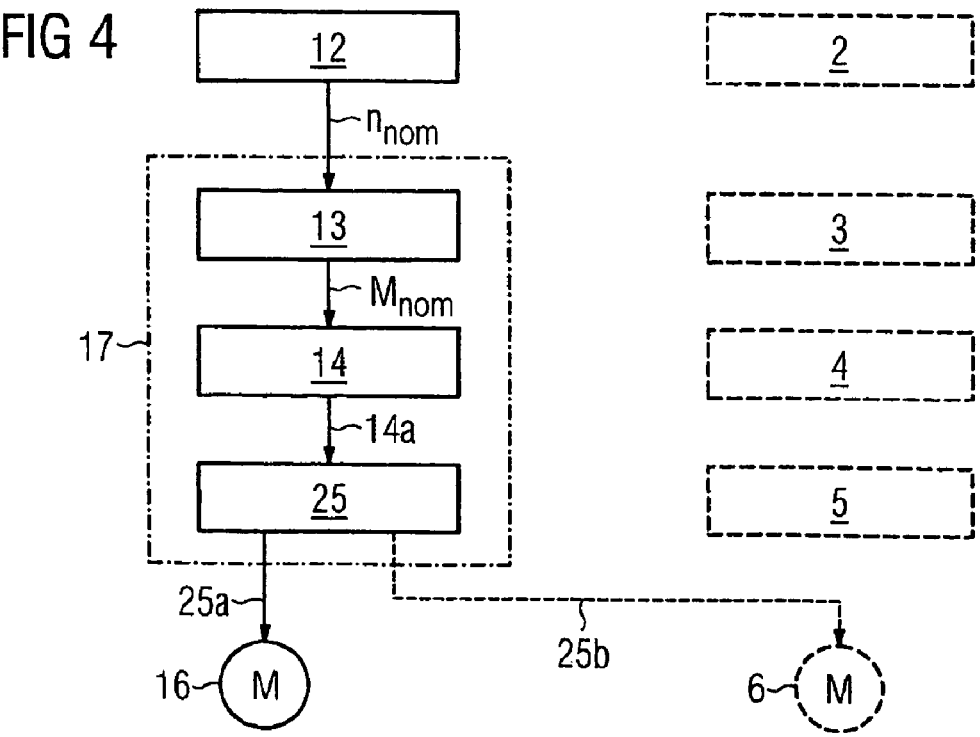

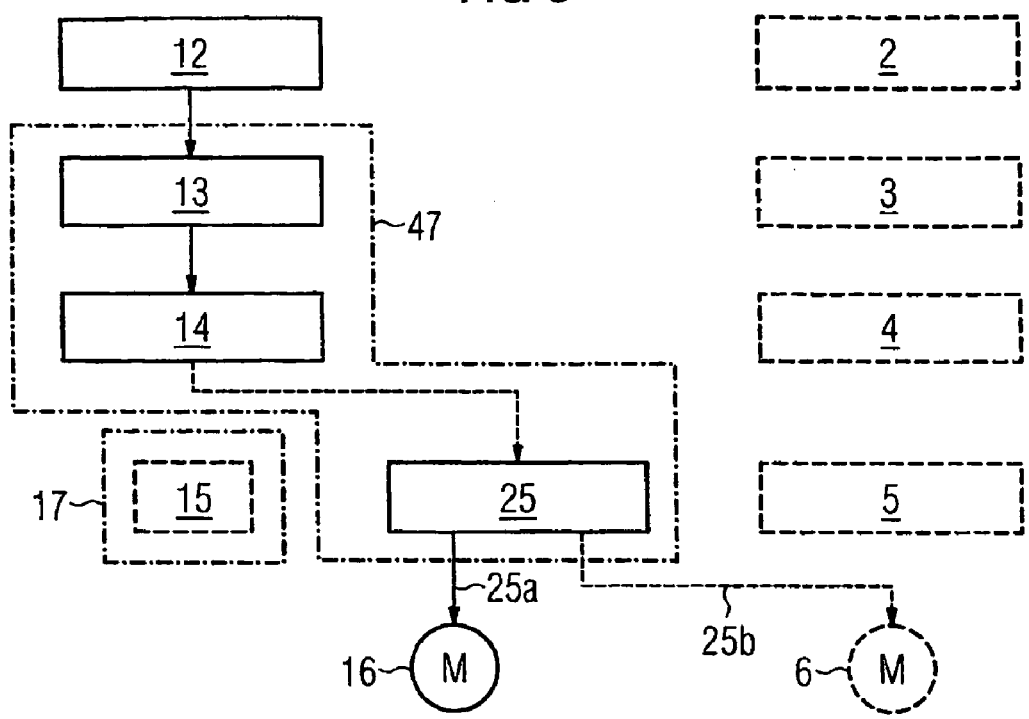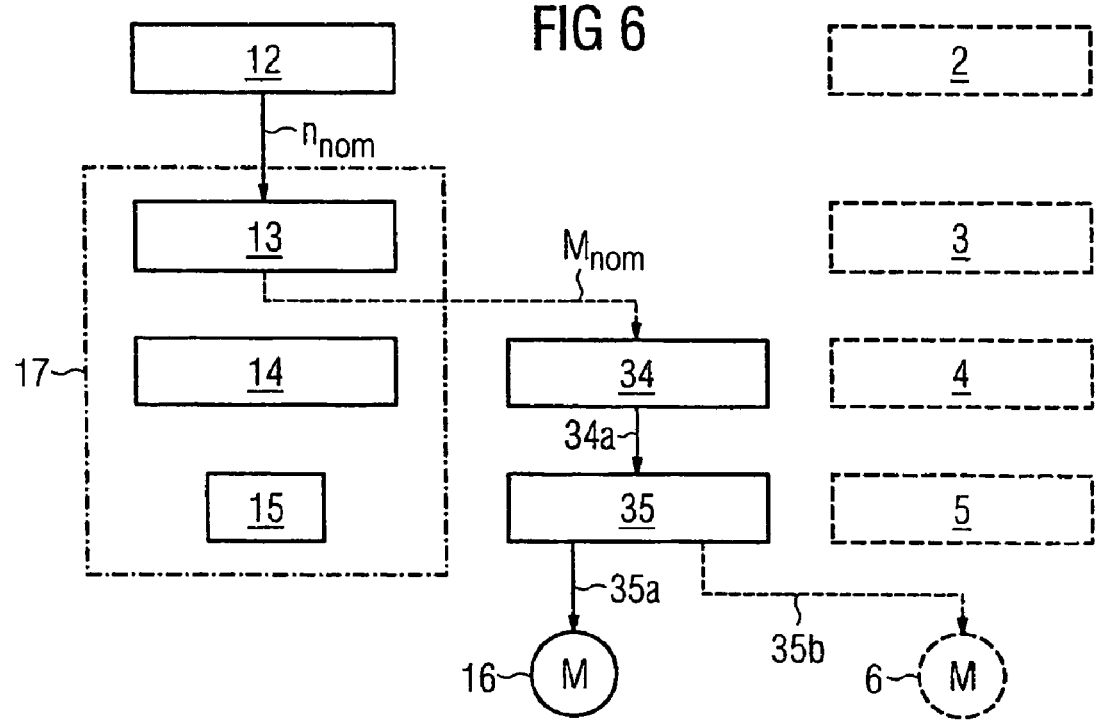

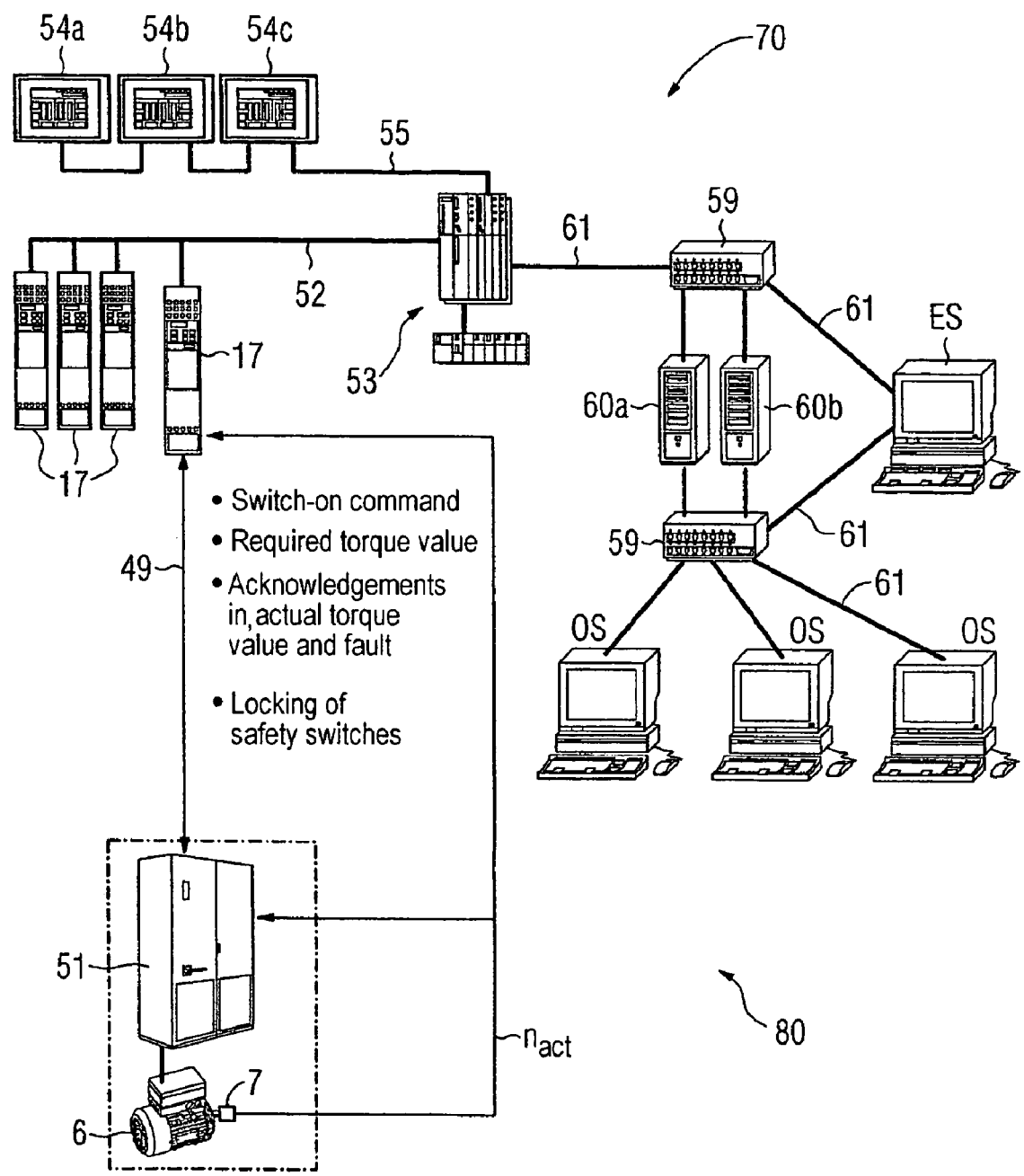

METHOD FOR MODERNIZING A TECHNICAL SYSTEM AND AN APPROPRIATE DRIVE ELEMENT

CROSS REFERENCE TO RELATED APPLICATIONS

This application is the US National Stage of International Application No. PCT/EP2004/004911, filed May 7, 2004 and claims the benefit thereof. The International Application claims the benefits of German application No. 10320826.7 DE filed May 8, 2003, both of the applications are incorporated by reference herein in their entirety.

FIELD OF INVENTION

The invention relates to a method for modernizing a technical system, especially a production system as well as a drive element.

BACKGROUND OF INVENTION

Many technical systems, especially production systems for manufacturing products on a production line system (e.g. paper, textiles, plastic foils, metal foils) have drive technologies which are no longer up to date, e.g. analog technology-based drives. This outdated technology has serious disadvantages since it exhibits an increased susceptibility to faults because it is getting older and as a result of external influences for example, an inability to repeat operations accurately and only limited diagnostic facilities. This results in unsatisfactory system availability, high scrap quotas and high failure costs.

To avoid these problems and to increase the productivity of the system, a modernization of the system can be undertaken, in which for example the drive and automation systems implemented in outdated analog technology are replaced by modern systems employing digital technology. Since the budget available for such upgrading however does not generally extend to a complete upgrading of the system, the system is subdivided into a number of subsections which are then modernized gradually. Each of these subsections, e.g. a multi-motor unit along with the power units feeding the motors (e.g. rectifiers, dc or ac converters), drive control and possibly higher-ranking automation, can then be planned and modernized separately in accordance with the available budget.

However such modernizing involves a high overall expenditure, since modifications will be required as a rule for an upgrading step both in the new, modernized part of the system as well in the existing system parts, especially at the existing automation level, to enable the new and old parts of the system to communicate with each other. Furthermore it is not possible with this process to implement a contemporary drive and automation concept which increases productivity while an old part of the system is still present. An implementation of the concept in the last step, i.e. for upgrading of the last part of the system, can also no longer be implemented at acceptable expense. Consequently all conventional approaches to solutions are not optimum from either a technical or a financial standpoint. Many system operators therefore put up with the disadvantages of the existing system and forego modernization of the complete system.

SUMMARY OF INVENTION

An object of the present invention is therefore to specify a method and an appropriate drive element which allows a technical system to be modernized in a way which is favorable from a financial standpoint as well as being advantageous from a technical standpoint.

In accordance with the invention this object is achieved by a method, drive element, and a production system with a drive element. Advantageous embodiments are in the dependent claims.

The invention is based on the idea that a commercially and technically useful modernizing of the technical system is possible by, instead of the conventional "vertical" segmentation of the system into a number of subsections and its step-by-step modernization i.e. the exchange of a complete drive unit along with the costly power section and the motors, a "horizontal" cross-section at the level of the nominal required torque of the individual drives is performed. This interface as a rule involves a standard interface and it is mostly possible without major problems to have the required torque value specified by another, new speed controller instead of by the existing speed controller of the drive motor.

In accordance with the invention this speed controller is located in a standard drive component which, in addition to the speed controller, features a torque controller and a power element. Such standard drive components are available in a very wide diversity of power classes and because of their standardized construction can be manufactured and also procured in high volumes. At the same time modern standard drive components make it possible to connect the drive element to a modern, higher-ranking automation system, which provides technological functions such as machine control, maintenance of nominal values, technological controlling etc. with the associated operation and monitoring functions (HMI—Human Machine Interface) and thus makes it possible to achieve the desired productivity improvements, availabilities etc. The costly drive components such as the power element and the motor are at this point not yet replaced by new components, so that the upgrade can be performed at relatively low cost. Because of the low costs of standard drive components, the fact that the torque controller and power element which they contain are not initially needed is not of any great importance, especially if power elements of a very low power class are provided.

The drive control and the automation level of the system can thus, in a single upgrade step in which all for the major components for production are renewed, be upgraded to a technical and technological state which corresponds to that of a modern, new system. The horizontal section at the level of the required torque value means that there are no resulting complex interfaces between new and old system parts. The outlay for interface adaptations can thus be kept low and technically less complex solutions which are appropriate to the functional requirements of modern systems and thereby advantageous from the technical standpoint can be implemented.

Execution of this method for all the drive elements present in the existing system enables a corresponding modern automation system to be provided for the overall system and thereby a new control and operating concept with all the advantages of modern technology to be implemented in the overall system, i.e. the parallel operation of different concepts associated from the technical standpoint with restrictions, e.g. parallel operation of an automation system with analog technology and an automation system with modern, digital technology does not occur.

Whereas the old technology was frequently identified by a plurality of widely different modules with the correspondingly large inventory of spares, the inventory of spares is reduced after the upgrade to the few elements remaining in the remaining power elements and motors.

In accordance with an advantageous embodiment of the invention there is provision for the speed controller of the standard drive component to obtain at least one required speed value from an automation system and thus to be linked into a system automation. As well as the nominal speed value, the standard drive component can in addition receive switch-on and switch-off commands from the higher-ranking automation system and can return fault and diagnostic messages to the automation system.

A further modernization of the system, especially if the power element of the standard drive component is not suitable for the power or the technology of the drive motor, is possible by replacing in a subsequent step the power element of the drive motor by a further power element adapted to the power and the technology of the drive motor, with the further power element being adapted to the torque controller of the standard drive component and being controlled by this, and with the torque controller of the standard drive component receiving a nominal torque value from the speed controller of the standard drive component. The (old) torque controller and power element which previously existed are then no longer needed.

The subsequent step can In this case then be arranged to be especially cost effective if the further power element is adapted to the standard drive component and replaces the power element of the standard drive component in the standard drive component.

In accordance with an alternative embodiment of the invention there is provision in the subsequent step for the further power element to be part of a further standard drive component. It is also possible in this way to cost effectively replace the previous (old) power element by a modern new power element tailored to the power of the drive motor.

Major outlay for setting the parameters of the drive controller can be avoided in this case by the further standard drive component being adapted to the speed controller and the torque controller of the standard drive component, and the speed controller and the torque controller removed from the standard drive component and integrated into the further standard drive component. The speed controller or torque controller which are already present and for which the control parameters are set can thus continue to be used, and setting new parameters for controlling can very largely be avoided. The previously used (modern) power element and the remaining part of the standard drive component are no longer needed.

If the further standard drive component also features a speed controller and a torque controller, the effort of setting parameters can also be avoided if the parameter-setting software of the speed controller and torque controller of the standard drive component can be loaded into the corresponding components of the further standard drive component.

In accordance with a further, alternate embodiment of the invention there is provision in a subsequent step for the torque controller of the drive motor to be replaced by a further torque controller and for the power element to be replaced by a further power element, with the further torque controller obtaining a nominal torque value from the speed controller of the standard drive component.

BRIEF DESCRIPTION OF THE DRAWINGS

The invention, as well as further advantageous embodiments of the invention in accordance with features of the subclaims, is explained below in a simplified and basic form in the drawings which refer to the exemplary embodiments. These show:

FIG. 3 a drive element with a standard drive component in accordance with FIG. 2

FIG. 4 the drive element of FIG. 3 with a feed to the drive motor from a further power element arranged in the standard drive component, FIG. 5 the drive element of FIG. 3 with a feed to the drive motor from a power element arranged in a further standard drive component, FIG. 6 the drive element of FIG. 3 with a feed to the drive motor from a further power element controlled by a further torque controller, and, FIG. 7 a number of drive elements linked into an automation system of a technical system

DETAILED DESCRIPTION OF INVENTION

Figure 1:
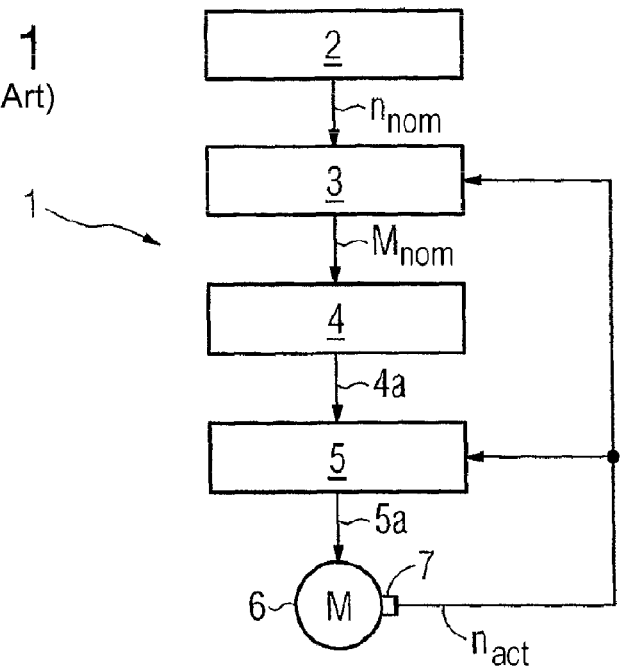
FIG. 1 a previous (old) drive element of a technical system.

FIG. 1 shows a previous (old) drive element 1 of a technical system, e.g. of a production system for paper making. The drive element 1 features a drive motor 6, a power element 5 feeding the motor 6 via a feed connection 5a, a torque controller 4 controlling the power element 5 via a control connection 4a and a speed controller 3 which specifies to the torque controller 4 a nominal torque value $M_{nom}$ with regard to the motor torque. An actual speed value $n_{act}$ required for control is recorded by a speed encoder 7 on the motor 6 and made available to the speed controller 3 and to the power element 5. The drive element 1 is subordinate to an (old) drive automation 2 which specifies a nominal speed value $n_{nom}$ to the speed controller 3. Both the drive element 1 and also the higher-ranking automation system 2 are essentially embodied in analog technology or in outdated digital technology and the drive motor 6 is also embodied in outdated direct current technology, so that the requirements as regards productivity, availability and manufacturing quality of the system are no longer fulfilled.

Figure 2:
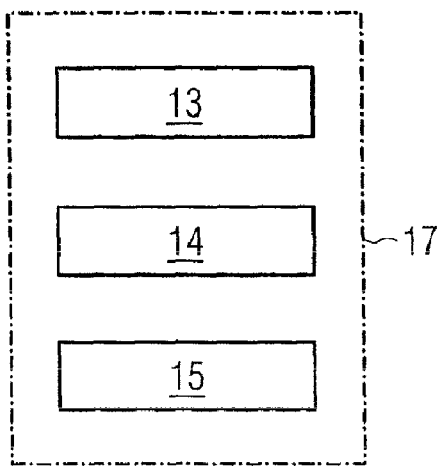
FIG. 2 a standard drive component.

FIG. 2 shows a modern standard drive component 17 to be used within the framework of the invention for modernization, which features at least one speed controller 13, a torque controller 14 and a power element 15. Such standard drive components are available from the applicant in a wide diversity of power classes as regards the power element, under the product name SIMOVERT MASTERDRIVE for example. By using standardized components, especially also standardized speed controllers, torque controllers and power elements in these components, these can be manufactured and procured at low cost. The standard drive component is embodied in digital technology, advantageously in accordance with the latest prior art.

For modernizing the system, in accordance with FIG. 3, the specification of the nominal torque value $M_{nom}$ for the torque controller 4 is deactivated by the speed controller 3 and a standard drive component 17 is provided in accordance with FIG. 2. The specification of the nominal torque value $M_{nom}$ for the torque controller 4 of the drive motor 6 is then undertaken by the speed controller 13 of the standard drive component 17. The drive element 1 thus features a drive motor 6 fed by the power element 5 and a torque controller 4 controlling the power element 5, with an output of the speed controller 13 of the standard drive component 17 being coupled to an input of the torque controller 4 of the power element 5 of the drive motor 6 for supplying the nominal torque value $M_{nom}$. The torque controller 14 and the power element 15 of the standard drive component 17 are not needed; The power element 15 can therefore be dimensioned very small as regards its output power. The standard drive component 17 is advantageously coupled to an automation system 12 for supplying at least one nominal torque value ($M_{nom}$) and is controlled and monitored by the latter. The units are advantageously connected by a field bus system, especially a Profibus system.

The speed controller 13 of the standard drive component 17 receives from the automation system 12 a nominal torque value and where necessary further switch-on and switch-off commands. In the reverse direction the standard drive component 17 notifies fault messages, diagnostic data, etc. back to the automation system 12 (not shown). The previously used (old) torque controller 4, power element 5 and drive motor 6 will continue to be used. They can be modernized later relatively inexpensively.

If all drive elements of the system corresponding to drive element 1 in accordance with FIG. 3 are modernized, the previous, old automation system can be completely replaced in the system by a new, modern automation system, where the connection of all drive elements to the new automation system is possible. Since the costly power elements and drive motors are not initially modernized, and not least because low-cost standard drive components are employed, a cost effective modernization of the system is possible.

In accordance with FIG. 4, in a next step for further modernization of the system, the power element 5 of the previous (old) drive motor 6 is replaced by a further power element 25, with the further power element 25 being adapted to the torque controller 14 of the standard drive component 17 and being controlled by this via a control connection 14*a*. The further power element 25 is in this case adapted to the standard drive component 17 and replaces the previous power element 15 of the standard drive component 17 in the standard drive component The power element 15 of the standard drive component 17 is dimensioned smaller, as regards its output power, than the further power element so that cost factors are not a particular factor in its replacement. The torque controller 14 in this case receives a nominal torque value $M_{nom}$ from the speed controller 13 of the standard drive component 17. This means that the previous (old) torque controller 4 and the previous (old) power element 5 are thus no longer needed. In addition the drive motor 6 can also be replaced by a modern drive motor 16, e.g. a low-maintenance asynchronous motor, and can be supplied with power by the power element 25 via feed lines 25*a*. Because of the close interrelationship between drive motor and power element it is best to modernize these two components at the same time. Power is then fed to the modernized drive motor 16 via power feed connection 25*b*. The power element 25 is adapted both as regards its output power and also its technology to the relevant drive motor 6 or 16 to which power is to be supplied.

Alternatively, in accordance with FIG. 5, the further power element 25 can also be part of a further standard drive component 47. The further standard drive component 47 is in this case adapted to the speed controller 13 and torque controller 14 of the standard drive component 17. The speed controller 13 and torque controller 14 are removed from the standard drive component 17 and integrated into the further standard drive component 47. The previous standard drive component 17 with the small-dimensioned power element 15 will then no longer be needed. Here too it is best to replace the drive motor 6 by a modern drive motor 16 at the same time.

FIG. 6 shows a further alternative for the modernization of the costly power element 5 and/or motor 6 of the drive element 1 undertaken in a subsequent step. In this case, in the subsequent step, there torque controller 4 of the drive motor 6 is replaced by a further modern torque controller 34 and the power element 5 of the drive motor is replaced by a further, modern power element. The further torque controller 34 in this case receives a nominal torque value $M_{nom}$ from the speed controller 13 of the standard drive component 17 and controls the power element 35 via a control connection 34*a*, said element in its turn feeding power via a feed connection 35*a* to the old drive motor 6 or via a feed connection 35*b* to the modern drive motor 16. The old torque controller 4 and the old power element 5 of the drive element 1 are then no longer needed, the same applies to the torque controller 14 and the power element 15 of the standard drive component 17. The power element 35 is adapted both as regards its output power and also its technology to the drive motor 6 or 16 to be supplied with power in each case.

Even if not explicitly shown and described, for all the drive elements described here, the power element feeding the drive motor and the speed controller specifying the required torque value $M_{nom}$ receives an actual speed value $n_{act}$ from one or more speed encoder arranged on the drive motor 6 or 16.

The inclusion of a number of drive elements in accordance with FIG. 3 into an automation system 70 or a plant 80 will now be illustrated with reference to FIG. 7. The plant 80 features a number of drive elements 1, of which only one is shown in the diagram. The power element and torque controller of the drive element 1 embodied in old technology is accommodated in a drive module 51. Upstream from the drive module 51 is a modern standard drive component 17, with the associated speed controller, torque controller and power element not being shown here. Via a communication connection 49 the torque controller of the drive module 51 receives a nominal torque value from the speed controller of the standard drive component 17. In addition the drive motor 51 receives further commands, e.g. switch-on and switch-off commands, from the automation system 70. In the other direction the drive module 51 notifies the actual torque value as well as further fault data to the standard drive component 17. Via the encoder 7 both the drive module 51 and also the standard drive component 17 receive an actual speed value $n_{act}$ of the drive motor 6.

Each of the standard drive components 17 is assigned at least one drive module 51 with one or more drive motors 6. The standard drive components 17 are connected via a communication network, especially a Profibus, to a central automation control unit 53. Via a further communication network 55 operator panels (HMI Interfaces) 54*a-c* communicate with the central automation control unit 53 and allow "local" operation and monitoring of the plant 80. Furthermore a number of operator stations OS for remote control of the plant by an attendant as well as an engineering station ES for setting the parameters of the drives and of the HMI interfaces are provided, which are connected via communication connections 61, especially industrial Ethernet connections, and communicate with each other and with the automation device 53 via switch modules 59. Data from the processes currently executing is stored in the servers 60*a* and 60*b*. For reasons of redundancy the data is stored both in the server 60*a* and also in the server 60*b*.

The invention claimed is:

1. A method for modernizing a technical system of a production system, comprising:
   providing a pre-existing drive element in the technical system, the drive element comprising:
   a drive motor,
   a first power element supplying power to the drive motor, a first torque controller controlling the first power element, and a first speed controller specifying a nominal torque value to the first torque controller;

deactivating by the first speed controller the specification of the nominal torque value for the first torque controller;

providing a standard drive component, comprising:

a second speed controller, a second torque controller, and a second power element; and specifying the nominal torque value for the first torque controller by the second speed controller.

2. The method according to claim 1, further comprising receiving a nominal speed value by the second speed controller from an automation system.

3. The method according to claim 1, further comprising receiving an actual speed value by the second speed controller from an encoder of the drive motor.

4. The method according to claim 3, further comprising: replacing the first power element by a further power element, controlling the further power element by the second torque controller, and receiving the nominal torque value by the second torque controller from the second speed controller.

5. The method according to claim 4, wherein the further power element is adapted to the standard drive component and replaces the second power element in the standard drive component.

6. The method according to claim 4, wherein the further power element is part of a further standard drive component.

7. The method according to claim 6, wherein the further standard drive component is adapted to the second speed controller and the second torque controller, and the second speed controller and the second torque controller are removed from the standard drive component and integrated into the further standard drive component.

8. The method according to claim 6, wherein the further standard drive component, comprising: a further speed controller, and a further torque controller, a parameter setting software of a second encoder or the second controller is loaded into a further encoder or the further torque controller.

9. The method according to claim 4, wherein the second power element is dimensioned smaller as regards to its output power than the further power element.

10. The method according to claim 4, wherein the further standard drive component is embodied in accordance to a digital technology.

11. The method according to claim 4, wherein the further standard drive component is embodied in accordance with a latest prior art.

12. The method according to claim 1, further comprising:

replacing the first torque controller by a further torque controller, replacing the first power element by a further power element, and receiving a nominal torque value from the second speed controller by the further torque controller.

13. The method according to claim 1, wherein the drive motor is replaced by a further drive motor.

14. The method according to claim 1, wherein the standard drive component is embodied in accordance to a digital technology.

15. The method according to claim 1, wherein the standard drive component is embodied in accordance with a latest prior art.

16. A modernized drive element system, comprising:

a pre-existing drive element, comprising:

a deactivated speed controller, torque controller, a power element controlled by the torque controller, and a drive motor supplied with power by the power element;

a standard drive element, comprising:

a speed controller having an output operatively connected to an input of the torque controller of the pre-existing drive element configured to supply a nominal torque value to the torque controller of the pre-existing drive element, torque controller, and a power element.

17. The modernized drive element system according to claim 16, wherein the standard drive component is coupled to an automation system for supplying a nominal speed value and is controlled and monitored by the system.

18. The modernized drive element system according to claim 17, wherein the standard drive component is coupled to the automation system via a bus.

19. The modernized drive element system according to claim 18, wherein the bus is a Profibus.

20. The modernized system according to claim 16, wherein the pre-existing drive element is based on an analog technology, and wherein the standard drive element is based on a digital technology.

21. The modernized drive element system according to claim 16, wherein an output of the speed controller of the pre-existing drive element is not configured to directly or indirectly control the drive motor, wherein an output of the torque controller of the standard drive element is not configured to directly or indirectly control the drive motor, and wherein an output of the power element of the standard drive element is not configured to directly or indirectly control the drive motor.

22. The modernized drive element system according to claim 16, wherein standard drive element is not coupled to a motor.

23. A productions drive element system of the paper and pulp industry, comprising:

a modernized drive element system according to claim 16; and an automation system is operatively connected to the standard drive via a bus system.

* * * * *